US011227405B2

(12) United States Patent
Khatoonabadi et al.

(10) Patent No.: US 11,227,405 B2
(45) Date of Patent: Jan. 18, 2022

(54) DETERMINING POSITIONS AND ORIENTATIONS OF OBJECTS

(71) Applicant: VANCOUVER COMPUTER VISION LTD., North Vancouver (CA)

(72) Inventors: Armin Khatoonabadi, North Vancouver (CA); Mehdi Patrick Stapleton, Vancouver (CA)

(73) Assignee: APERA AI INC., North Vancouver (CA)

( * ) Notice: Subject to any disclaimer, the term of this patent is extended or adjusted under 35 U.S.C. 154(b) by 35 days.

(21) Appl. No.: 16/624,601

(22) PCT Filed: Jun. 21, 2018

(86) PCT No.: PCT/CA2018/050761
§ 371 (c)(1),
(2) Date: Dec. 19, 2019

(87) PCT Pub. No.: WO2018/232518
PCT Pub. Date: Dec. 27, 2018

(65) Prior Publication Data
US 2020/0134857 A1 Apr. 30, 2020

Related U.S. Application Data

(60) Provisional application No. 62/523,108, filed on Jun. 21, 2017.

(51) Int. Cl.
*G06T 7/73* (2017.01)
*G06T 7/44* (2017.01)
(Continued)

(52) U.S. Cl.
CPC .............. *G06T 7/73* (2017.01); *G06K 9/6212* (2013.01); *G06K 9/6276* (2013.01); *G06T 7/13* (2017.01); *G06T 7/44* (2017.01); *G06T 7/55* (2017.01)

(58) Field of Classification Search
None
See application file for complete search history.

(56) References Cited

U.S. PATENT DOCUMENTS 9,049,411 B2 6/2015 Venkataraman et al.
9,086,484 B2 7/2015 Medasani et al.
(Continued)

FOREIGN PATENT DOCUMENTS

CN 106303247 A * 1/2017
CN 106657809 A * 5/2017
(Continued)

*Primary Examiner* — Mohammed Rachedine
(74) *Attorney, Agent, or Firm* — Oyen Wiggs Green & Mutala LLP

(57) ABSTRACT

Methods and apparatus for determining poses of objects acquire plural images of the objects from different points of view. The images may be obtained by plural cameras arranged in a planar array. Each image may be processed to identify features such as contours of objects. The images may be projected onto different depth planes to yield depth plane images. The depth plane images for each depth plane may be compared to identify features lying in the depth plane. A pattern matching algorithm may be performed on the features lying in the depth plane to determine the poses of one or more of the objects. The described apparatus and methods may be applied in bin-picking and other applications.

20 Claims, 8 Drawing Sheets

(51) Int. Cl.
  *G06T 7/55* (2017.01)
  *G06T 7/13* (2017.01)
  *G06T 7/33* (2017.01)
  *G03B 15/02* (2021.01)
  *G03B 5/08* (2021.01)
  *H04N 13/243* (2018.01)
  *H04N 13/271* (2018.01)
  *H04N 13/128* (2018.01)
  *H04N 13/00* (2018.01)
  *H04N 5/357* (2011.01)
  *H04N 17/00* (2006.01)
  *H04N 5/222* (2006.01)
  *H04N 5/247* (2006.01)
  *G06K 9/62* (2006.01)

(56) References Cited

U.S. PATENT DOCUMENTS

| | | | |
|---|---|---|---|
| 9,094,661 B2 | 7/2015 | Venkataraman et al. | |
| 9,240,049 B2 | 1/2016 | Ciurea et al. | |
| 9,438,888 B2 | 9/2016 | Venkataraman et al. | |
| 9,519,972 B2 | 12/2016 | Venkataraman et al. | |
| 9,521,319 B2 | 12/2016 | Rodda et al. | |
| 9,563,955 B1* | 2/2017 | Kamarshi | G06K 9/00791 |
| 9,894,298 B1* | 2/2018 | Solh | H04N 9/64 |
| 10,445,892 B2* | 10/2019 | Alibay | G01S 17/08 |
| 2009/0074238 A1 | 3/2009 | Pfister et al. | |
| 2010/0103175 A1 | 4/2010 | Okutomi et al. | |
| 2011/0293142 A1 | 12/2011 | van der Mark et al. | |
| 2012/0163672 A1 | 6/2012 | McKinnon | |
| 2015/0146030 A1 | 5/2015 | Venkataraman et al. | |
| 2016/0267672 A1 | 9/2016 | Ciurea et al. | |
| 2016/0309134 A1* | 10/2016 | Venkataraman | G02B 27/017 |
| 2017/0148155 A1* | 5/2017 | Wei | H04N 9/04 |
| 2017/0214907 A1* | 7/2017 | Lapstun | G09G 3/02 |
| 2018/0189550 A1* | 7/2018 | McCombe | G06K 9/00926 |

FOREIGN PATENT DOCUMENTS

| | | | |
|---|---|---|---|
| EP | 2370954 B1 | 11/2013 | |
| EP | 2589215 B1 | 1/2016 | |
| EP | 3101624 A1 | 7/2016 | |
| GB | 2209900 B | 3/1992 | |
| WO | 2012001568 A1 | 1/2012 | |
| WO | WO-2016183380 A1 * | 11/2016 | G06K 9/00288 |

* cited by examiner

DETERMINING POSITIONS AND ORIENTATIONS OF OBJECTS

CROSS-REFERENCE TO RELATED APPLICATION

This application claims priority from U.S. Application No. 62/523,108 filed 21 Jun. 2017. For purposes of the United States, this application claims the benefit under 35 U.S.C. § 119 of U.S. Application No. 62/523,108 filed 21 Jun. 2017 and entitled DETERMINING POSITIONS AND ORIENTATIONS OF OBJECTS which is hereby incorporated herein by reference for all purposes.

FIELD

This invention relates to machine vision. Embodiments provide methods and apparatus useful for identifying visual features lying in specified depth planes and/or determining locations and orientations of objects. The invention has example applications in the field of controlling robots to pick objects from bins.

BACKGROUND

Various manufacturing and other processes involve the use of machine vision to identify features that are at a specified depth relative to an image sensor. It can be challenging to separate such features from image features at other depths.

An example of such an application is controlling robots to pick up objects. A machine vision system may be positioned to view a heap of objects with the goal of identifying one object to be picked up next.

The so-called "bin-picking problem" involves finding the 6D pose (3D translation and 3D orientation) of objects within a container (i.e. bin). The bin may contain many identical or similar objects. Once the pose has been determined, a grasp-planning system may act upon the 6D pose information and retrieve individual objects.

Some approaches to determining poses of objects use 3D laser-scanners, structured light projectors, or RGB-D sensors to generate a 3D point-cloud corresponding to a pile of objects within a bin. The 3D point-cloud is then processed to identify and localize individual objects within the pile.

Problems with currently available scanning systems for pose estimation include one or more of: available 3D laser scanning technologies are expensive; pose estimation requires large computational resources; and such systems are not capable of reliably determining poses of objects to a level of precision sufficient for some tasks.

Stereo vision approaches use multiple cameras to determine 3D locations of object features by triangulation. 6D pose hypotheses may then be generated based on noisy 2D-3D correspondences. Such approaches can suffer from erroneous correspondences between views of an object acquired by different cameras, and are ill-suited for texture-poor objects.

State-of-the-art algorithms for pose estimation of texture-less/texture-poor objects based on images of the objects include template-based approaches, deep-learning approaches and dense-feature approaches. Template-based approaches attempt to encapsulate all potential views of an object using a synthetic/real viewpoint sampling of the target object. The observed view is matched against the database of template views based on a specific similarity metric. Dense-feature approaches learn correspondences between collections of pixel intensity values and the 3D coordinates of the object relative the object centroid. Neighbouring pixel collections are used to come to a consensus on the 3D coordinates of an object. Deep-learning approaches use convolutional neural networks (or another translation-invariant learner) to learn features based on input images to ultimately extract an image descriptor to characterize the poses of observed objects.

There is a general need for machine vision systems and methods capable of picking out image features at specified depth planes, especially in cases where image features from other depth planes create distracting clutter. There is a need for technological solutions which facilitate picking objects in cases where the positions and orientations of individual objects to be picked are not initially known. There is a need for methods and apparatus capable of identifying the positions and orientations of objects which are, for example, randomly heaped in a bin.

Summary

This invention has a number of aspects. These include, without limitation:
 machine vision systems adapted for determining poses of objects;
 methods for determining poses of objects;
 methods for decluttering images;
 systems for decluttering images;
 methods for identifying object features lying at one or more depth planes;
 apparatus for identifying object features lying at one or more depth planes;
 robotic pick and place systems.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of the invention relates to methods for determining the poses of objects and apparatus configured to apply such methods. A method according to some embodiments involves the steps of:
 a) obtaining a plurality of images of a field of view which includes one or more objects within a target volume from different points of view;
 b) processing the images to correspond to a first depth plane in the target volume to yield depth plane images corresponding to the depth plane;
 c) processing the depth plane images to locate features (e.g. edges or contours) in the images;
 d) eliminating features that are not consistently located in the depth plane images (and therefore correspond to features not located at the current depth plane);
 e) repeating steps b) to d) for different depth planes; and
 f) applying a 2D pose estimation algorithm to find objects in the images.

Processing the depth plane images to locate features may apply any of a wide variety of feature extraction methods. A wide range of such methods are known to those of skill in the image processing art. For example, feature extraction may comprise low level methods such as one of or any combination of edge detection, corner detection, curvature detection, ridge detection and blob detection; a template matching method (that may be informed by knowledge of the objects expected to be in the image); a method based on random forest processing; methods involving feature transformations (e.g. scale-invariant feature transforms); methods based on Hough transforms, parameterized shapes or active contours and the like. Some example feature detection methods that may be applied in the present technology are described in Mark S. Nixon and Alberto S. Aguado, *Feature Extraction and Image Processing*, Elsevier, 2008 ISBN: 978-0-12372-538-7 which is hereby incorporated herein by reference. In some embodiments features include one or more lines, curves, points or groups of pixels that correspond to parts of objects.

In some embodiments feature detection is performed once for a first depth plane and images in which features have been detected are transformed to correspond to different depth planes.

In some embodiments the depth planes progress sequentially from a higher elevation to a lower elevation. In such embodiments processing may terminate when a pose of one object has been determined.

Figure 7:
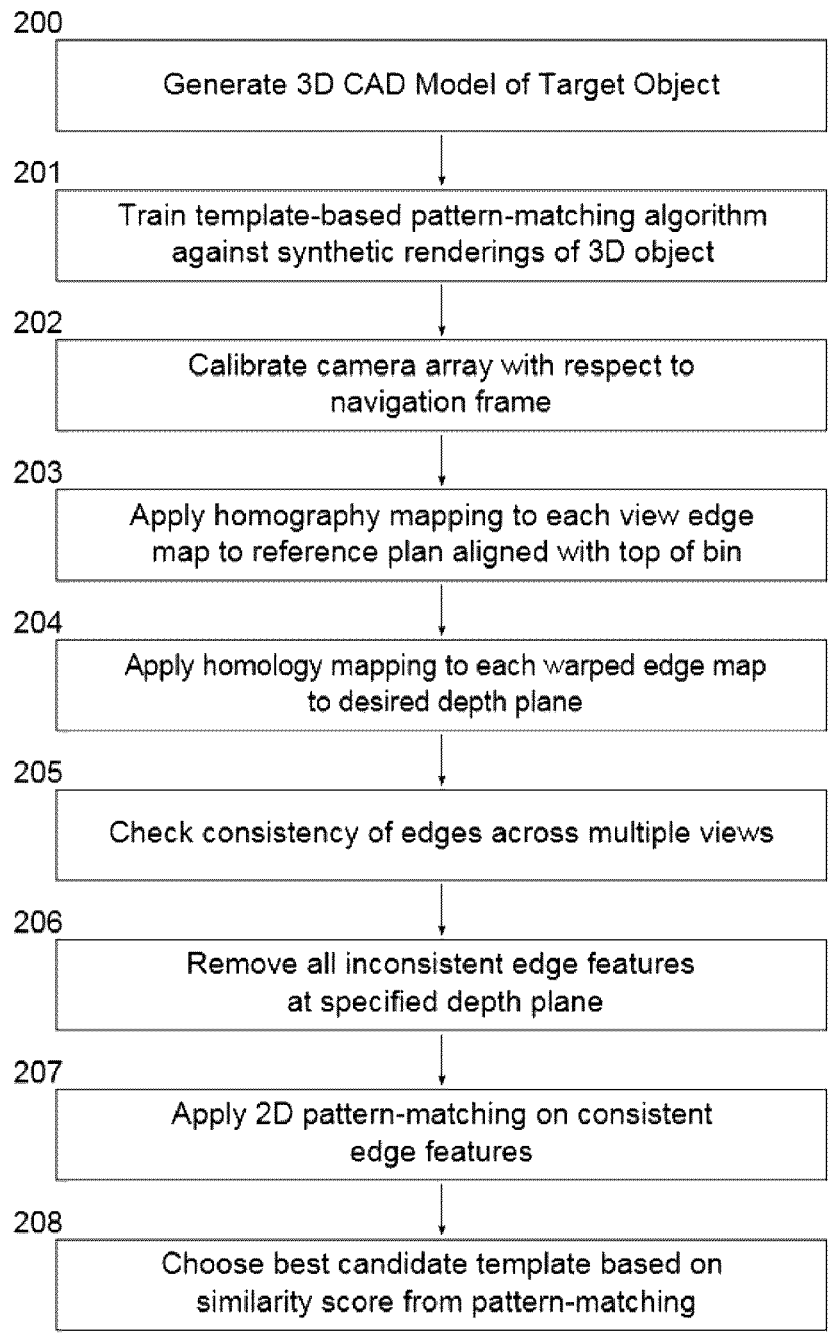
FIG. 7 is a high-level flow-chart showing an example algorithm for determining the position and orientation of an object within a bin of parts.

FIG. 7 is a flow chart illustrating a method according to an example implementation.

Figure 1:
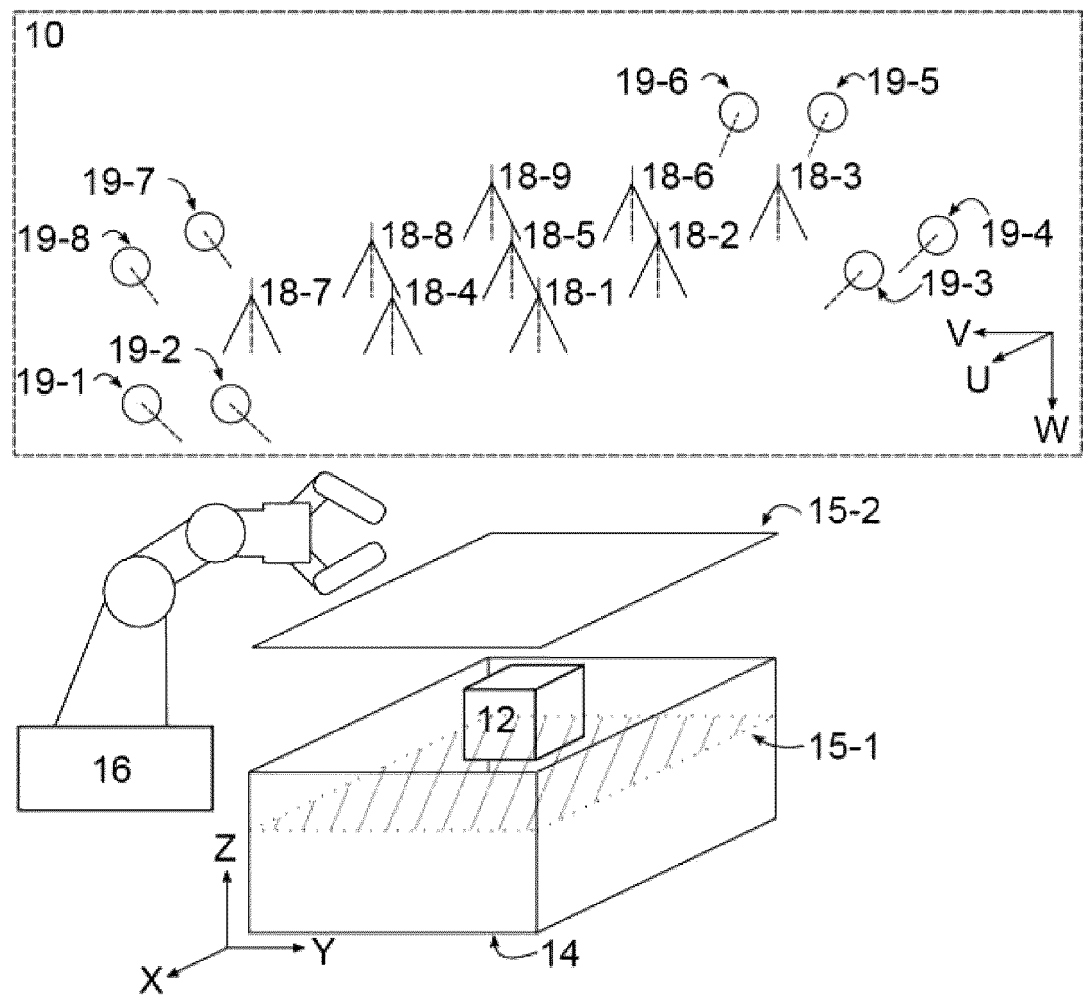
FIG. 1 is a 3D profile of an example imaging system including the imaging target of interest (e.g. a bin of objects).

FIG. 1 shows an example machine vision system 10. System 10 may execute the method of FIG. 7, for example. In the example of FIG. 1, system 10 is being applied to determine the poses of objects 12 in a bin 14. Objects 12 may be randomly piled in bin 14. System 10 may operate to determine poses of one or more objects 12 in bin 14. Example depth planes 15-1, 15-2 etc. are illustrated in FIG. 1. In this example bin 14 provides a target volume within which system 10 is designed to determine the poses of objects 12.

Data specifying the poses may be passed to a robot system 16 which may operate to pick objects 12 out of bin 14 and perform some task with the objects 12 (e.g. performing work on the objects, loading the objects into a machine, assembling the objects into a structure, sorting the objects, or the like).

System 10 operates by acquiring and processing images which show the objects 12 within bin 14 from different points of view. Those of skill in the art will understand that any of a wide variety of arrangements of cameras could be used to acquire suitable images. The following description explains some non-limiting example arrangements of cameras.

In the illustrated embodiment, system 10 includes a plurality of cameras 18, identified individually as 18-1, 18-2, 18-3 . . . 18-N. The number of cameras 18 used in a system 10 may be varied. Example embodiments provide arrays containing in the range of 3 to 25 cameras 18 (8 to 12 cameras 18 in some embodiments).

Preferred embodiments take advantage of the fact that small high-resolution digital cameras are now widely available and inexpensive. Cameras 18 may comprise, for example, cameras of the type sold as 'webcams' or IP cameras or the like. Cameras 18 may be monochrome (e.g. greyscale) cameras or colour (e.g. RGB) cameras. Cameras 18 may be provided by imaging sensors such as RGB-D sensors, CCD arrays, APS arrays and/or the like equipped with suitable lenses.

The locations of cameras 18 are known in a common reference frame. For example, cameras 18 may be mounted to a frame which supports the cameras 18 at known positions relative to one another and relative to bin 14. Each camera 18 is calibrated. As a result of the calibration, any pixel coordinate of an image sensor of the camera 18 can be associated to a corresponding ray passing through the target volume.

Alternative embodiments acquire suitable images using a single imaging array equipped with an optical system that focuses images from different points of view onto the imaging array at the same or different times or a single camera that is moved to acquire images from different points of view.

FIG. 1 shows an example in which cameras 18-1 to 18-9 are arranged in a regular array looking into bin 14. In some embodiments, the array is a square lattice and each camera is separated from its nearest-neighbouring cameras by a fixed distance.

It is convenient but not mandatory for cameras 18 to:
 be supported in a common plane; and/or
 behave like pin-hole cameras to a desired level of accuracy; and/or
 be arranged in a regular array; and/or
 be at an equal height above a reference plane of bin 14 (e.g. a floor of bin 14); and/or
 be identical to one another; and/or
 have equal resolutions; and/or
 be arranged so that an optical axis of each camera is orthogonal to the array of cameras; and/or
 be arranged so that the optical axis of each camera is orthogonal to the reference plane of bin 14; and/or
 have a field of view sufficient to image all of bin 14; and/or
 have the same focal length.

These conditions facilitate processing. Deviations from any or all of these conditions may be accommodated at the expense of additional processing.

In some cases it may be desirable for the camera array to lie in a plane that is tilted relative to a reference plane (e.g. inclined relative to a horizontal plane). For example, in some cases it may be impractical or undesirable to mount an array of cameras 18 directly above a bin 14 or other area to be monitored by cameras 18. In such cases the depth planes used in processing could be oriented at an angle to the camera array. The form of a homology mapping (described elsewhere herein) may be changed to achieve this.

System 10 may include light sources to illuminate objects 12 in the target volume (e.g. objects in bin 14). The light sources could include for example lamps of any kind such as LED lamps, incandescent lamps, fluorescent lamps, gas discharge lamps, arc lamps, etc. The light sources may be broadband or narrowband light sources. The light sources emit light that can be detected by cameras 18 after being reflected from objects 12. In some embodiments the light sources emit infrared (IR) light. In such embodiments, cameras 18 may comprise filters that pass the IR light and block light of at least some other wavelengths.

Figure 6:
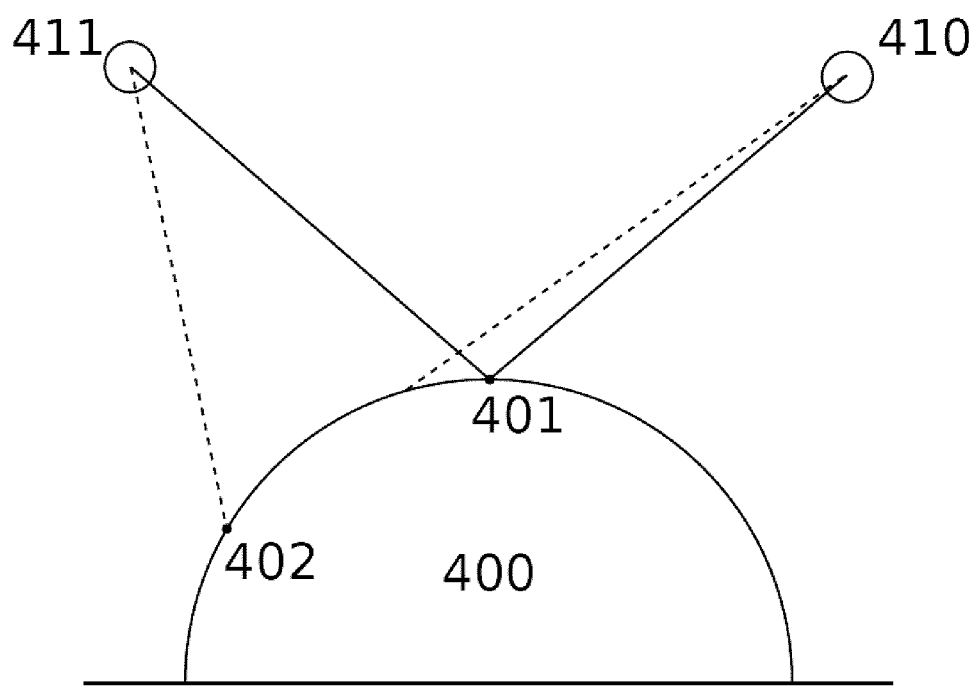
FIG. 6 shows two illumination sources flanking a dome shaped object, with correspondingly two pairs of illumination rays indicating regions on the dome of shared and disparate illumination.

The light sources may illuminate objects 12 in bin 14 with light incident from different directions. This can facilitate imaging of edges and other features of objects 12. FIG. 6 shows an example case in which an object 400 is illuminated by light from sources 410 and 411. Different points on the surface of object 400 are illuminated differently. Point 401 is illuminated by both of light sources 410 and 411 whereas point 402 is illuminated only by light source 411. Optionally, light sources which illuminate objects 12 from different directions emit light having different characteristics (e.g. different colours and/or different polarizations) and/or are controlled to emit light at different times.

The illustrated system 10 includes lighting elements 19. Lighting elements 19 are located to illuminate the interior of bin 14. For example, FIG. 1 shows lighting elements 19 arranged on all sides of the array of cameras 18. Lighting elements 19 are oriented to emit light beams that are at least generally aligned with the line between the centroid of each lighting element 19 and the center of the target volume. Lighting elements 19 illuminate objects 12 in the target volume from different illumination source directions.

In some embodiments different lighting elements 19 are operated in conjunction with operating different cameras 18 to obtain images of objects 12 in bin 14. For example, some or all of cameras 18 may acquire images while bin 14 is illuminated with light from each of a plurality of different source directions or different combinations of source directions. In some cases this can help in the detection of features such as edges of objects 12 captured in the images.

Lighting elements 19 are not required in all cases. In other embodiments system 10 may operate under ambient lighting from external sources (e.g. room lights).

In the particular example system 10 as shown in FIG. 1, cameras 18 are the same as one another and are arranged in a planar array. A plane of the array is parallel to the bottom face of the target volume (e.g. a flat bottom of bin 14). The optical axis of each camera in the array is orthogonal to the planar array and is directed toward the target volume (e.g. each camera 18 may be oriented with its optical axis pointing vertically down into bin 14).

The array of cameras 18 is used to acquire sets of images of the target volume. The images show at least some objects 12 in the target volume. Images of each set may be acquired simultaneously or at different times. Preferably, each image includes in its field of view the entire interior of bin 14 or other target volume.

Each image is processed using calibration information for the corresponding camera 18 to obtain coordinates in a world coordinate system corresponding to pixels of the image. Since each pixel of the image corresponds to a particular direction rather than a single point in 3D space, it is convenient to express the world coordinates corresponding to pixels in homogeneous coordinates (also called projective coordinates). Where cameras 18 behave sufficiently like pinhole cameras, the world coordinates can be determined using a homography transformation.

Figure 5:
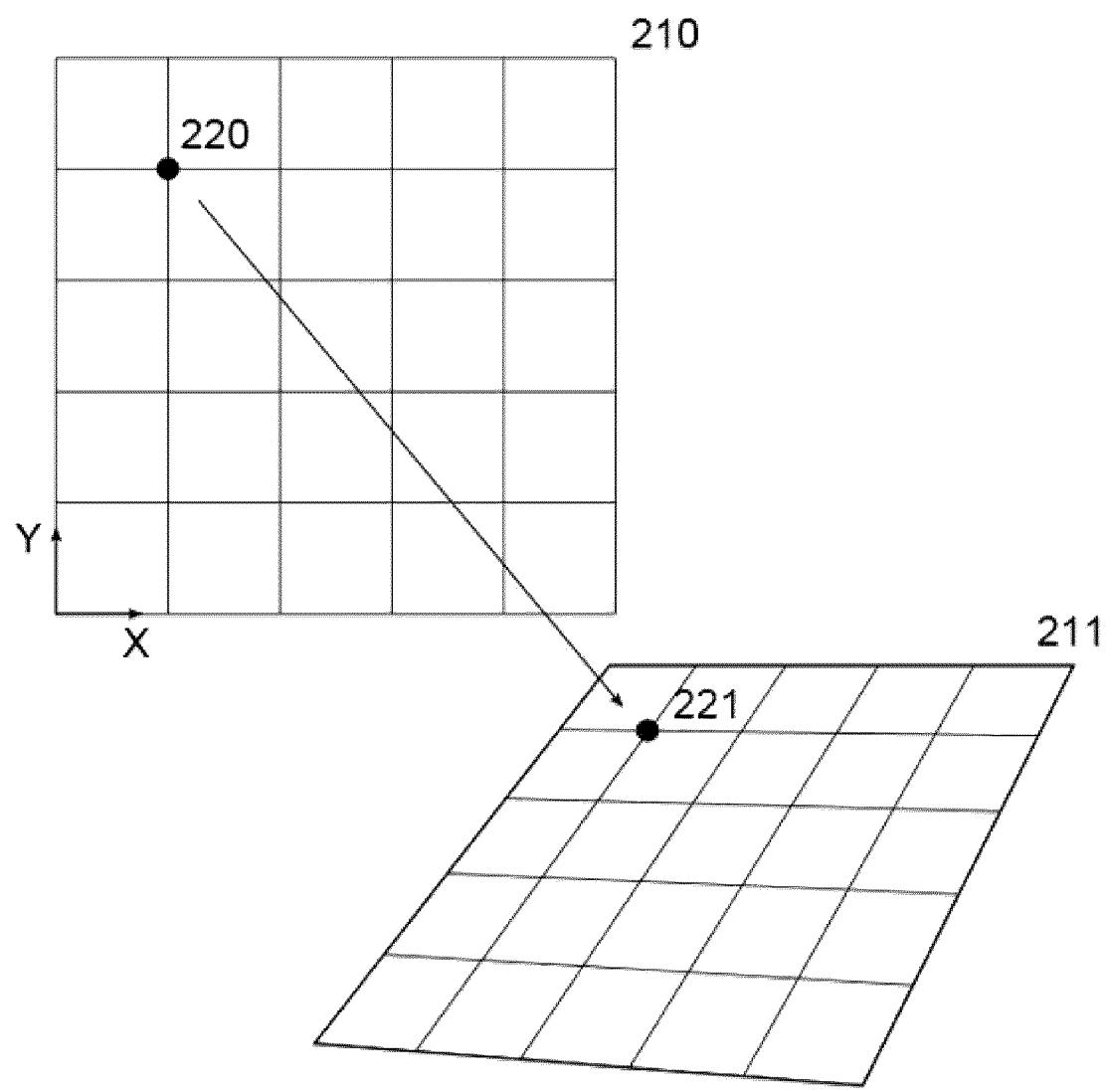
FIG. 5 illustrates an example homography mapping of a 2D plane.

A homography is a projective mapping or warping from two 2-dimensional (2D) planes. An example 2D plane grid 210 is illustrated in FIG. 5. A single point 220 on the 2D plane is warped under a projective transformation (i.e. homography) to the point 221 on the warped plane 211. Homogeneous coordinates in a 2D plane can be defined as follows: given the point 220 with coordinates $x=[x, y]$, the normalized homogeneous coordinates are $\tilde{x}=[x, y, 1]$. This represents the point as a line in 2D projective space with the equivalence relation $[x, y, 1] \sim \lambda [x, y, 1] \forall \lambda \in \mathbb{R}$. The general form of a 2D homography mapping can be represented in matrix form as, $$\tilde{x}'=H\tilde{x}, \ H\in \mathbb{R}^{3\times 3} \qquad (1)$$

where the $\tilde{x}'$ represents the coordinates of the warped point under the homography H.

It can be valid to model cameras 18 as pin-hole camera approximations in the absence of significant lens-distortion. In general, known lens distortions can be corrected by applying suitable transformations to reverse the effect of the lens distortion on the images.

Many commercially available cameras have lenses of sufficient quality that the cameras can be modeled by the pinhole approximation to sufficient accuracy for many implementations of the present invention without compensating for lens distortions. Some wide angle lenses introduce significant lens distortions into images. In cases where wide angle lenses or other lenses that introduce distortions are used, such lens distortions may be corrected for by applying a suitable transformation that reverses the effect of the lens distortion. The issue of lens distortions may be avoided by avoiding wide-angle lenses.

Figure 2:
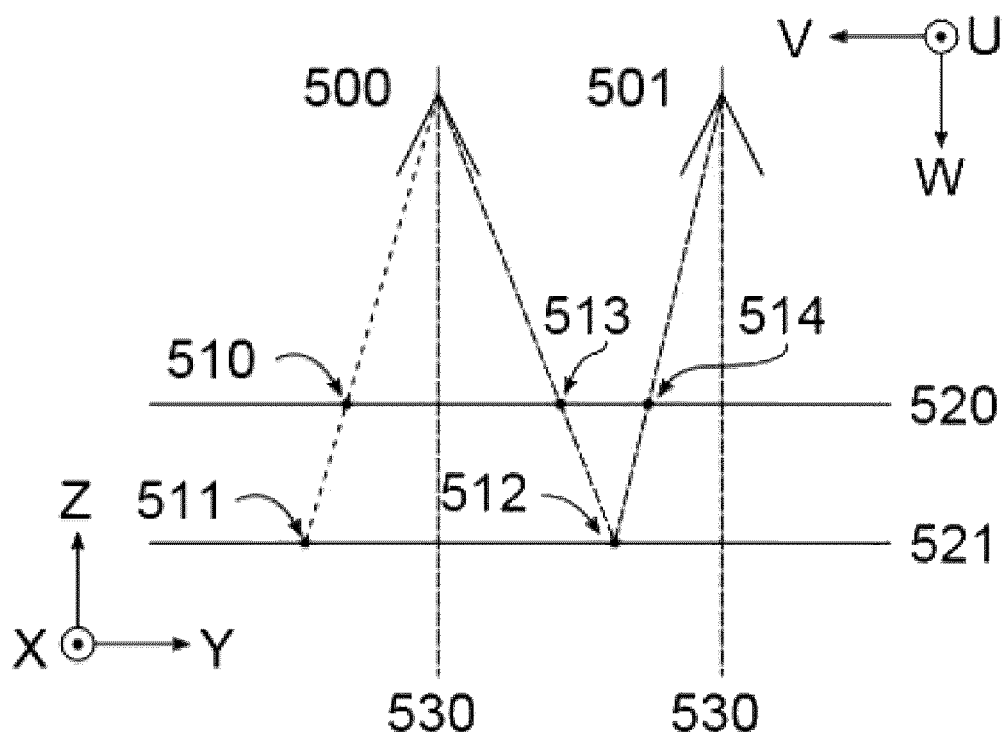
FIG. 2 is a schematic drawing illustrating a projection ray between the camera center of an imaging element and two different depth-planes.

The pin-hole camera model is expressable as a mapping from 3D to 2D projective space, as shown in FIG. 2. The mapping is between two coordinate systems, the navigation or world coordinate system and the image coordinate system. The world coordinate represents physical coordinates (e.g. the location of the centroid of a specific object 12 in bin 14). The image coordinate system represents the coordinates of individual pixels in the images acquired by cameras 18. The mapping is expressable in the following form, $$\tilde{x}_i=P\tilde{X}_w, \ P\in \mathbb{R}^{3\times 4} \qquad (2)$$

where $\tilde{X}_w$ and $\tilde{x}_i$ represent the homogeneous coordinates of the world coordinate and the image coordinate, respectively, $\mathbb{R}^{3\times 4}$ is the set of 3×4 real matrices, and P is a camera matrix which can be decomposed into the following three matrices, $$P=KR \ [I-C], \ K, I, R\in \mathbb{R}^{3\times 3} \qquad (3)$$

where K and R are the intrinsic matrix and rotation matrix from world to camera coordinate systems, respectively. The world coordinate axes are denoted X, Y, and Z as shown in FIG. 1. I is the 3×3 identity matrix and C is the coordinates of the location of the center of the camera in world coordinates. The intrinsic matrix is assumed to be of the form, $$K = \begin{bmatrix} f_u & s & u_0 \\ 0 & f_v & v_0 \\ 0 & 0 & 1 \end{bmatrix} \qquad (4)$$

where: $f_u$, $f_v$, s, $u_0$, $v_0$ are respectively: the focal length (in pixels) in the column and row directions, the skew, and the column and row coordinates of the principal point in image coordinates. The principal point is located at the intersection of the camera's image plane with a line extending from the camera center orthogonal to the camera image plane.

As noted above, the method processes the images to identify features of one or more objects 12 depicted in the images. Features may comprise, for example, corners, edges, boundaries between different colours or textures, projections, recesses and the like. Objects 12 themselves and the individual features of objects 12 can lie in different depth planes within the target volume.

Identifying features of objects 12 which lie in different depth planes may be done, for example, using an edge coherency method. With such a method the images are each processed by a mapping from the image plane to a particular depth plane in the target volume to yield depth plane images. The locations of the depth-planes (in world coordinates) depend on the locations of the cameras.

Each depth plane image for each camera projects all of the features in the original image acquired by the camera onto a particular depth plane. The spacing between the features in the depth plane image depends on the distance from the camera to the depth plane and the focal length of the lens of the camera. The locations of the features (in world coordinates) depends on the locations of the cameras and the positions of the features in the depth plane images.

Features of objects 12 that are depicted in the images and are not at elevations corresponding to the depth plane will be at different locations in the depth plane images for different ones of cameras 18. Features of objects 12 that are depicted in the images and are at the elevation corresponding to the depth plane will be at the same locations (expressed in world coordinates) in the different images. Features of objects 12 that are at the elevation corresponding to the depth plane can be identified and isolated from other features depicted in the images by determining whether or not depictions of the features in the different images are shifted relative to one another (features not in the depth plane appear at shifted locations while features in the depth plane appear at the same location). This may be repeated for a suitable range of depth planes.

The depth planes may be processed in sequence starting with a depth plane above all objects 12 in bin 14 and progressing toward the bottom of bin 14. The depth planes may be spaced apart from one another by a suitable distance (which may be varied depending on the sizes of objects 12 and the accuracy with which poses of objects 12 must be determined). In example embodiments the spacing of adjacent depth planes is in the range of about 0.3 mm to about 1 cm. Depth planes may have spacings outside of this range. Also, it is not mandatory that all depth planes be equally spaced-apart from adjacent depth planes.

In some embodiments the spacing of depth planes is adaptively adjusted. For example, depth planes may be initially spaced apart by larger distances. Upon detecting object features in a depth plane a system may process the image data to inspect depth planes separated by smaller distances.

As objects 12 are removed from bin 14 the elevation of the topmost objects 12 in bin 14 will, in general, decrease (until more objects 12 are put into bin 14). In some embodiments, scanning of the depth planes may begin with a depth plane at or just above an elevation at which a topmost object 12 was found in a previous scan.

In some embodiments a range finder is provided to measure an elevation of the top of a pile of objects 12 in bin 14. In such embodiments the scan of the depth planes may begin at or just above an elevation determined by the range finder. The range finder could, for example, comprise an ultrasonic or laser range finder or an optical rangefinder that compares images from two spaced apart ones of the cameras to estimate an elevation of the topmost objects 12 in bin 14.

This processing facilitates estimating poses of one or more top-most objects 12 in bin 14 by removing background clutter in the images. The background clutter is largely made up of images of portions of objects 12 that do not fall within the top-most layer of the pile of objects 12 in bin 14. Background clutter means any image detail which is not of interest to the imaging system for the present task. The present task corresponds to the pose estimation of the top-most objects within the container of objects. Other objects within bin 14 and features of bin 14 itself correspond to background clutter in this example. Background clutter distracts imaging systems and increases the chance of erroneous object pose estimation. In order to mitigate the effect of background clutter, system 10 identifies imaged features lying at a specific depth plane within bin 14 of objects 12. System 10 does this by identifying features that are located consistently across the warped camera views under the homography (and homology) mappings of Eqn. (1) onto the specific depth plane.

The collection of image views from the array of cameras 18 effectively allows isolation of features of objects 12 in a top-most layer of objects 12 in bin 14 from the background clutter of other objects 12 deeper in the pile. The aggregation of the images from cameras 18 effectively has a shallow depth-of-field at the top-most layer of the pile of objects. Any features of the image outside this depth-of-field are removed automatically using edge-coherency checks.

Residual features remaining after removal of background clutter may be used as input to a pattern-matching technique for estimation of the 6D pose of the objects of interest. The imaging system computes the 6D (3D translation and 3D orientation) of the top-most objects in a container of similar objects based on the residual features. The imaging system provides the 6D pose information to an external system for retrieval of the objects of interest. Once the retrieval has been performed, the imaging system commences a sweep of the pile of objects from the depth of the previously retrieved objects. An example algorithm is shown at a high-level in FIG. 7.

It is convenient to process the images once to detect features and to then perform transformations to yield depth plane images which can be compared to determine which of the features lie in a depth plane corresponding to the depth plane images.

In some embodiments, features that unambiguously belong to a current depth plane (e.g. features having positions that match across all cameras for a particular set of depth plane images) are deleted from subsequent depth plane images. Doing this can reduce clutter in the subsequent depth plane images.

Separate homography transformations may be performed to obtain each depth plane image. However, computation may be reduced by performing homography transformations from image planes of the images to a first depth plane and then transforming the resulting images to other depth planes using simpler transformations.

Given the calibrated camera matrix $P_i$ of the $i^{th}$ camera in the planar array, the mapping between world coordinates lying on the reference plane $z=h_b$ ($h_b$ is the height of bin 14) and the image view of the $i^{th}$ camera can be represented as follows, $$\begin{bmatrix} u \\ v \\ 1 \end{bmatrix} \sim P \begin{bmatrix} x \\ y \\ h_b \\ 1 \end{bmatrix} \quad (5)$$

where both the world plane point and image point are in homogeneous coordinates. The equivalence operator "~" is used to denote the scale-ambiguity present as a result of using homogeneous coordinates and u and v are pixel coordinates (column and row respectively) of an image point.

Since the height of the world plane points is fixed at $h_b$, the mapping via the camera matrix can be reformulated as, $$d \begin{bmatrix} u \\ v \\ 1 \end{bmatrix} = [p_1 \; p_2 \; p_4 + h_b p_3] \begin{bmatrix} x \\ y \\ 1 \end{bmatrix} \quad (6)$$

the depth of the reference plane along the optical axis of the camera is denoted by d. The 3×3 transformation matrix in Eqn. (6) is an example of a homography as in Eqn. (1). The homography is inversed in order to map the image plane coordinates to the reference plane coordinates, $$\begin{bmatrix} x \\ y \\ 1 \end{bmatrix} = d[p_1 \; p_2 \; p_4 + h_b p_3]^{-1} \begin{bmatrix} u \\ v \\ 1 \end{bmatrix} \quad (7)$$

As noted above, processing involves scanning depth-wise across multiple depth planes. For computational efficiency, a simpler mapping may be computed between the reference plane and the desired depth-plane as opposed to computing a homography mapping from the image plane to depth-plane(s). As shown in FIG. 2, given two mappings from a common image point to two world plane points (510 and 511) in the form of Eqn. (7), a mapping can be defined between the two world plane points, $$\begin{bmatrix} x_2 \\ y_2 \\ 1 \end{bmatrix} = \frac{d_2}{d_1} [p_1 \; p_2 \; p_4 + z_2 p_3]^{-1} [p_1 \; p_2 \; p_4 + z_1 p_3] \begin{bmatrix} x_1 \\ y_1 \\ 1 \end{bmatrix} \quad (8)$$

where $[x_i, y_i, z_i]$, $\forall i \in 1,2$ are the two world plane points. $d_2$ and $d_1$ are the depths of the world planes in front of the camera, along the optical axis. The matrix inversion can be reformulated using the well-known Sherman-Morrison formula, $$\begin{bmatrix} x_2 \\ y_2 \\ 1 \end{bmatrix} = \frac{d_2}{d_1} \left[ A^{-1} - \frac{A^{-1} p_3 [0 \; 0 \; z_2] A^{-1}}{1 + [0 \; 0 \; z_2] A^{-1} p_3} \right] [p_1 \; p_2 \; p_4 + z_1 p_3] \begin{bmatrix} x_1 \\ y_1 \\ 1 \end{bmatrix} \quad (9)$$

where the notational convenience matrix A is introduced in place of $[p_1 \; p_2 \; p_4]$. The matrix inversion is valid assuming A is non-singular, which is contingent on the array of cameras 18 not lying on the plane $z=0$. The mapping of Eqn. (9) can be reduced to the following, $$\begin{bmatrix} x_2 \\ y_2 \\ 1 \end{bmatrix} = \frac{d_2}{d_1} \begin{bmatrix} 1 & 0 & \frac{\alpha_1(z_1-z_2)}{1+\alpha_3 z_2} \\ 0 & 1 & \frac{\alpha_2(z_1-z_2)}{1+\alpha_3 z_2} \\ 0 & 0 & 1 + \frac{\alpha_3(z_1-z_2)}{1+\alpha_3 z_2} \end{bmatrix} \begin{bmatrix} x_1 \\ y_1 \\ 1 \end{bmatrix} \quad (10)$$

where the notational convenience vector $\alpha = [\alpha_1 \alpha_2 \alpha_3]$ is introduced in place of $A^{-1} p_3$. $\alpha$ is derived as follows:

$$\alpha = A^{-1} p_3 \quad (11)$$

$$= \left( KR \begin{bmatrix} 1 & 0 & -C_1 \\ 0 & 1 & -C_2 \\ 0 & 0 & -C_3 \end{bmatrix} \right)^{-1} p_3 \quad (12)$$

$$= \begin{bmatrix} 1 & 0 & -\frac{C_1}{C_3} \\ 0 & 1 & -\frac{C_2}{C_3} \\ 0 & 0 & -\frac{1}{C_3} \end{bmatrix} R^{-1} K^{-1} KR \begin{bmatrix} 0 \\ 0 \\ 1 \end{bmatrix} \quad (13)$$

$$= \begin{bmatrix} -\frac{c_1}{c_3} \\ -\frac{c_2}{c_3} \\ -\frac{1}{c_3} \end{bmatrix} \quad (14)$$

In these equations, $C_1$, $C_2$, and $C_3$ are coordinates of the camera center. By substituting Eqn. (11) into Eqn. (10), the mapping can be reformulated as, $$\begin{bmatrix} x_2 \\ y_2 \\ 1 \end{bmatrix} = \begin{bmatrix} \frac{d_2}{d_1} & 0 & -C_1 \frac{d_2-d_1}{d_1} \\ 0 & \frac{d_2}{d_1} & -C_2 \frac{d_2-d_1}{d_1} \\ 0 & 0 & 1 \end{bmatrix} \begin{bmatrix} x_1 \\ y_1 \\ 1 \end{bmatrix} \quad (15)$$

The mapping of Eqn. (15) corresponds to a simple scaling and shift between one depth plane and the other. This computational mapping is a homology. It is computationally efficient to perform this type of mapping.

Figure 3:
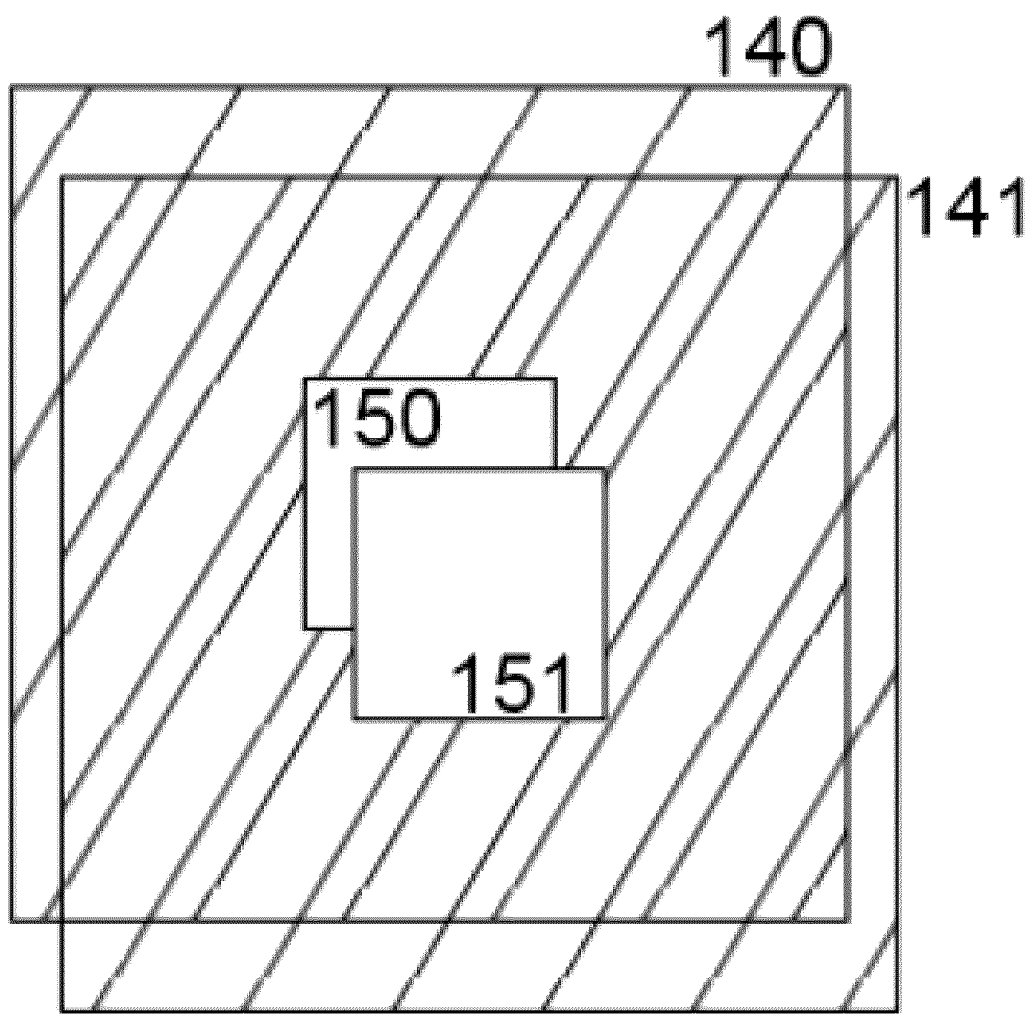
FIG. 3 is an example superposition of two different camera views after warping onto a common depth plane.

FIG. 3 shows example images (140 and 141) of two different cameras in the planar array, the images (150 and 151) of a common object are offset from each other since the top face of the object is not on the current depth-plane.

Processing the depth plane images to remove features not lying in the current depth plane may be performed by processing the depth plane images individually to identify features such as contours, comparing the locations of the contours or other features in different images and then deleting features that are not at the same locations in the different depth plane images.

In some embodiments it is not necessary for a feature such as a contour to be identified in every one of the images. In some embodiments a feature is considered to belong to the current depth plane if the feature is present and located at the same location within some set threshold in a desired proportion of the images such as, for example, at least 7 of 9 images or at least 8 of 9 images, at least 75% of the images, at least 85% of the images, etc.

FIG. 2 illustrates an example of the consistency and inconsistency that arises between individual object points (512-514). The world point 512 indicates a consistent point on the specific depth plane 521. Points 513 and 514 illustrate two inconsistent points if the imaging system attempts to isolate image features lying in depth-plane 520. The discrepancy between plane points can be derived using Eqn. (15) to warp a common plane point onto an out-of-focus plane as follows, $$\begin{bmatrix} x^a - x^b \\ y^a - y^b \end{bmatrix} = \frac{d_2 - d_1}{d_1} \begin{bmatrix} C_1^b - C_1^a \\ C_2^b - C_2^a \end{bmatrix} \quad (16)$$

where $[x^a, y^a]$ and $[x^b, y^b]$ are the inhomogeneous plane coordinates of points 513 and 514 in FIG. 2, the subscripts indicate the corresponding camera view. $d_1$ and $d_2$ are the depths along the common normal to the camera array plane to the depth planes 521 and 520, respectively. $C^a$ and $C^b$ are the camera centers of the left (500) and right (501) camera in FIG. 2 (i.e. $c^a = \{c_1^a, c_2^a, c_3^a\}$ and $C^b = \{c_1^b, c_2^b, c_3^b\}$)

Figure 4A:
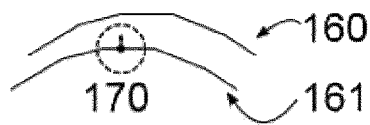
FIGS. 4A and 4B show two views of a common object contour and highlights the search region about each edge pixel on the contour.
Figure 4B:

The discrepancy induced by considering specific depth planes is used by the edge-coherency algorithm to remove background clutter. FIGS. 4A and 4B show two sets of contours (160, 161 and 162, 163). The contours do not coincide because the object that caused the contour does not lie in the current depth plane.

One way to determine whether a feature (e.g. a contour at a point such as 170) is coherent across two images is to:
  Compute the edge-direction of the contour at the point 170;
  Establish a search radius about a neighbourhood surrounding the point (the search radius may be predetermined);
  Determine whether the other image includes a similar contour point with an approximately similar edge direction;
  If so, identify the contour point as being coherent with the current depth plane.
The edge direction of a contour point may be computed, for example using an edge-detection technique which uses surrounding pixels in a neighbourhood about the contour point. Such edge-detection techniques are known to those of skill in the image processing art. It can be convenient to quantize the edge direction, for example, into eight different levels, with anti-parallel edge directions quantized to the same level. Averaging of adjacent or neighbouring edge directions can be used to remove any spurious noise in the directions. For example, median filtering may be applied on the edge direction images to remove any spurious edge directions incongruent with neighbouring edge directions.

A specific example embodiment uses a machine-learning algorithm (e.g. random forest) to determine the presence of an edge at a target pixel and if so, the orientation and strength of the edge. The algorithm may process patches of the image. For example, the algorithm may process 32×32 pixel image patches each containing 1024 neighbouring pixel intensity values surrounding a target pixel.

The machine learning algorithm may, for example, be trained using a plurality of renderings of one or more bin scenes. Each bin scene may, for example, comprise a different arrangement of one or more objects 12 within bin 14.

In some embodiments, the renderings comprise computer generated image data accurately representative (e.g. corresponding to photographic representations) of bin scenes having one or more objects 12 within bin 14. In bin scenes comprising at least two objects 12, the objects 12 may have the same or different poses. In some embodiments, the renderings are generated from one or more synthetic (e.g. computer-generated) images. Such synthetic images may, for example, comprise computer generated representations of one or more objects 12 and/or bin 14.

Some embodiments apply plural light sources (e.g. a multi-flash system) to detect edge discontinuities in the scene in addition to or in the alternative to other edge detection methods. Such embodiments may detect edge discontinuities by comparing images acquired under different lighting conditions (e.g. with illumination incident on the target volume from different directions).

Figure 4C:
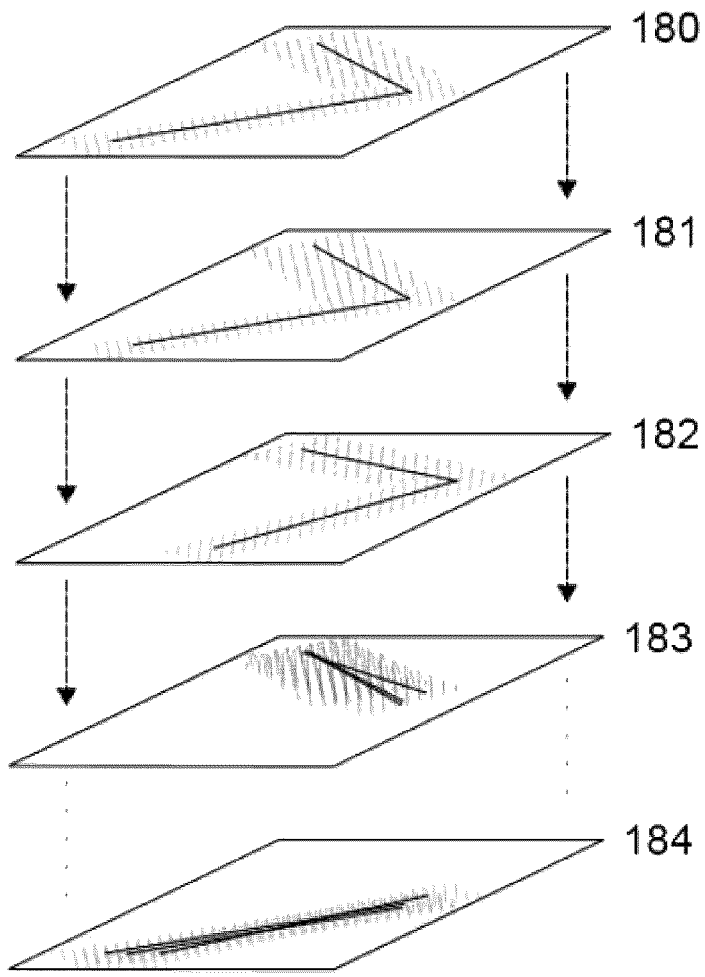
FIG. 4C shows the aggregation of dilated contours with identical quantized gradient directions.

As shown in FIG. 4C, the contours extracted in each image from each camera in the planar array (18-1, . . . , 18-N) may be morphologically dilated with a structuring element equivalent to the area spanned by the edge-coherency search region. The contours can then be segmented based on the quantized gradient directions of the segments. The dilated segments can then be aggregated to form edge-coherency maps for different directions (183 and 184 indicate edge coherency maps for two directions). The regions of high support in the aggregate images are indicative of contour points with edge-coherency across the different camera views.

Hysteresis thresholding may be applied to extract the regions of high support and 8-connected regions of medium support. The resultant thresholded images can then be masked with the original edge maps to prevent superficial contour points from being generated as a result of the morphological dilation.

Figure 8:
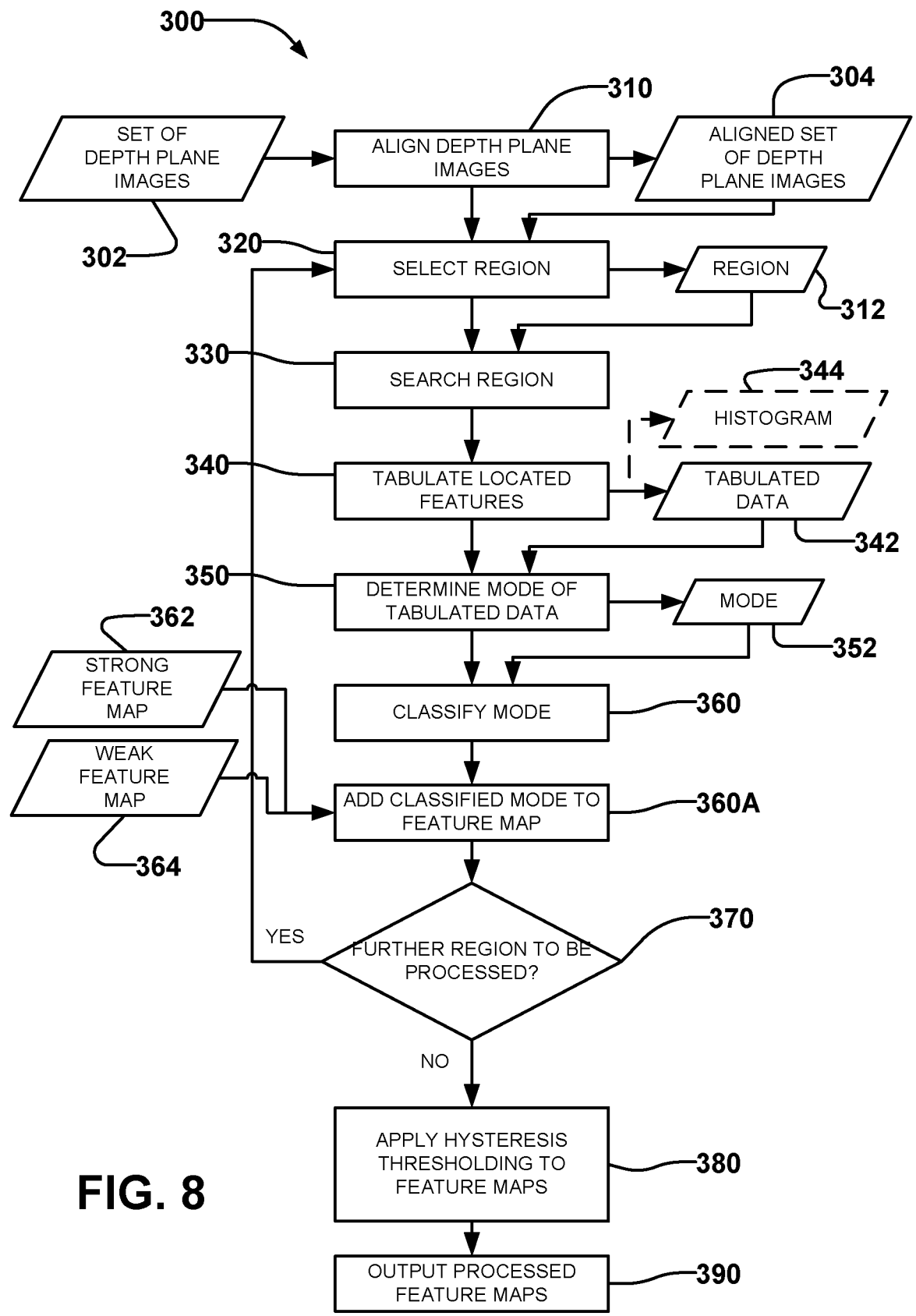
FIG. 8 is a flow chart illustrating a method according to an example embodiment.

In some embodiments, features present within a set comprising a plurality 302 of depth plane images corresponding to a depth plane (e.g. a plurality of images resulting from homography mappings as described elsewhere herein) are detected using method 300 shown in FIG. 8.

In block 310, each image in the set 302 of depth plane images is aligned with the other images in set 302 to yield an aligned set 304 of depth plane images. In some embodiments, each of the images in set 302 are vertically stacked and aligned with one another to generate aligned set 304. In aligned set 304 pixel locations of different depth images of set 302 that correspond to the same points in the corresponding depth plane are associated with one another. In such embodiments, corresponding pixels in different depth plane images of set 302 (which can be visualized as each pixel along a vertical ray passing through aligned set 304) may correspond to the same part of a target volume.

Method 300 processes regions 312 in the set of depth plane images to identify features such as edges, etc. In the example shown in FIG. 8, block 320 selects a region 312. Each region 312 comprises a group of pixels in an area of each image in the aligned set 304 of depth plane images. Regions 312 may be defined in any of a wide range of suitable ways. For example, each region 312 may be made up of those pixels that are in a neighbourhood of a pixel location in aligned set 304. By way of non-limiting example, regions 312 may comprise:
  pixels within an area (e.g. a circular, square or rectangular area) centered at a pixel location;
  pixels within an n-pixel wide perimeter around a defined group of pixels anchored at a pixel location;

etc.

It is not necessary for regions 312 to be large. In some embodiments regions 312 are a few pixels in radius or a few pixels in each direction. In some embodiments a few pixels is in the range of 2 to 20 pixels.

In some embodiments, each pixel location in aligned set 304 is processed (i.e. the number of regions 312 that are processed is equal to the number of pixel locations in aligned set 304). Different regions 312 may be processed serially and/or in parallel.

Block 330 searches each region 312 in each image of aligned set 304 for possible features. Optionally, searching region 312 comprises determining orientations of possible features (e.g. orientations of edges) located in the region 312. Some non-limiting example methods for enhancing recognition of features in depth plane images of aligned set 304 include morphological-processing (e.g. using a dilation method with a structure element resembling the region 312), a smoothing technique using filter kernels (e.g. Gaussian filter kernels, triangle filter kernels, epanechnikov filter kernels, etc.).

In real world cases, processing of different depth plane images in aligned set 304 may identify different features in a region 312 and/or a certain feature may be identified in some depth plane images of aligned set 304 and not others. This may result from the different viewpoints of the images acquired by cameras 18 as well as noise. Examples of noise include image noise in a camera's field of view, noise from configuration of cameras 18, noise from imperfections in warping a camera image to a depth plane image as described elsewhere herein. Noise generated during feature extraction and/or feature searching (e.g. block 330 of method 300) or the like may result in features that are not consistently present and/or not in perfect alignment across aligned set 304 of depth plane images. Vote-counting methods which may comprise "hard-voting" or "soft-voting" may be applied to determine what features to associate to a region 312.

In some embodiments, the features searched for comprise object contour edges. The edges may be quantized (i.e. categorized into a set of discrete edge orientations). In such embodiments, one or more histograms 344 corresponding to one or more regions 312 may, for example, be used to assess support for a given edge orientation within a region 312. Support may be measured, for example, by a number of features in the region 312 that are of a particular feature type (e.g. a particular edge orientation).

Features with support below a threshold level of support may be optionally removed from the images in aligned set 304 of depth plane images to reduce clutter in the images. Reducing clutter in the images may increase a rate and accuracy of object detection (e.g. reducing clutter reduces number of features present in the images of aligned set 304, reduces likelihood of erroneous features, lowers likelihood of false-positive feature detection, etc.).

Features located by block 330 within region 312 for each image in aligned set 304 are tabulated in block 340 to yield tabulated data 342. Tabulated data 342 records zero or more features identified by processing pixel values for pixels located within region 312 within each depth plane image in aligned set 304. Tabulated data 342 may be processed to identify a feature to be associated to the region 312. In some embodiments, tabulated data 342 includes all features located in region 312 for each image in aligned set 304.

Processing tabulated data 342 may comprise, for each depth plane image in aligned set 304 counting a number of features located by block 330 of each of a plurality of types (i.e. generating histogram data). For example, block 330 may detect several features in a region 312 that each correspond to a particular quantized orientation. The number of features for each orientation may be counted.

Histogram data may be used for voting. A range of voting schemes are possible. For example:
one vote may be cast for each depth plane image of aligned set 304. The vote may be for the feature type (e.g. an edge, edge orientation, a shadow, etc.) that is most frequent in the results of the block 330 search. Results of these votes may be tabulated and the winning feature type may be associated to the region 312. This is an example of a 'hard' vote.
results of the block 330 search for each depth plane image may be processed to yield a fractional likelihood that the region 312 corresponds to a particular feature type. Fractional likelihoods may be provided for two or more feature types in some cases. Fractional likelihoods may, for example, be based on one or more of the number of features of different types located by the search of block 330, the degree to which the located features match the feature type (i.e. how closely does the pattern of pixels that have been identified as corresponding to a feature of a particular type resemble a feature of that type, other factors such as spatial-proximity to a center of the region 312, etc.). The fractional likelihoods may be combined to determine a most probable feature type for the region 312. This is an example of a 'soft' vote.

Some regions 312 may not correspond to features (e.g. there may be no object contours in the depth plane in the region 312). In some embodiments a feature type is 'non-feature'. One or more depth plane images in aligned set 304 may vote that the feature type corresponding to region 312 is a "non-feature".

Tabulated data 342 may, for example, be aggregated by generating a histogram 344. Histogram 344 is representative of tabulated data 342. In some embodiments, a separate histogram is generated for each image in aligned set 304. Each separate histogram may, for example, be combined (e.g. added together) to generate histogram 344. In embodiments where each image in aligned set 304 contributes a single vote to tabulated data 342 (i.e. a 'hard' vote as described elsewhere herein), a mode value (e.g. the most frequently occurring data value in a set of data points (e.g. a feature, a feature orientation, and/or the like)) of each separate histogram may be used to generate histogram 344.

In the example illustrated in FIG. 8, a mode value 352 of tabulated data 342 is determined in block 350 (e.g. by determining a mode value of histogram 344). Mode value 352, may, for example, correspond to a feature most likely represented by region 312 and/or a feature most likely represented by the pixel location in aligned set 304 defining region 312. In block 360, mode value 352 is classified (or labeled).

In some embodiments, mode value 352 is classified as a strong or a weak feature. For example a mode value 352 equal to or higher than a threshold value may be classified as a strong feature and a mode value 352 less than the threshold value may be classified as a weak feature. The threshold may, for example, correspond to a number of images in aligned set 304 in which a feature corresponding to mode value 352 should consistently be located within region 312 of each of the images in aligned set 304 for mode value 352 to be classified as a "strong feature" (e.g. if a feature corresponding to mode value 352 is found in at least N images of aligned set 304, mode value 352 may be classified as a strong feature).

In some embodiments, mode value 352 is classified as corresponding to a strong feature, a weak feature or a non-feature. In such embodiments, at least two different threshold values may be used. For example, a first threshold may be used to differentiate between strong and weak features and a second threshold value may be used to differentiate between weak features and non-features. A mode value 352 equal to or above the first threshold may be classified as a strong feature, a mode value 352 less than the first threshold but equal to or higher than the second threshold may be classified as a weak feature and a mode value 352 less than the second threshold may be classified as a non-feature, for example. The first and second threshold values may, for example, be functionally similar to the single threshold used to classify mode 352 as either a strong or weak feature described elsewhere herein.

One or more of the threshold values described herein may be pre-set (i.e. set prior to method 300 being commenced) and/or updated in real time.

In block 360A, a mode value 352 classified as a strong feature is added to a strong feature map 362 (an image comprising pixel values corresponding to located features classified as strong features). A mode value 352 classified as a weak feature is added to a weak map 364 (an image comprising pixel values corresponding to located features classified as weak features).

In the illustrated method 300 regions 312 are processed serially. Block 370 may return method 300 to block 320 where the next region 312 to be processed is selected.

Block 380 performs hysteresis thresholding using strong and weak feature maps 362, 364. In some embodiments, features from weak feature map 364 are used to improve continuity of edges identified in strong feature map 362. For example, strong feature map 362 may be processed to locate breaks or discontinuities in identified edges. If weak feature map 364 indicates that weak features exist which would partially or completely fill in the breaks or discontinuities then such weak features may be promoted to strong features (e.g. to fill in gaps between pixel locations classified as strong edges). The result may be a strong feature map 362 with improved continuity of detected edges. The strong feature map may be compared to a template or 2D or 3D model of an object to determine a pose of an object.

Optionally, a pixel location classified as representing a weak feature in weak feature map 364 may be reclassified as a non-feature if the pixel location can not fill in a lapse in strong feature map 362. Optionally, if strong and weak feature maps 362, 364 comprise feature orientations (e.g. edge orientations), sub-maps of maps 362, 364 (i.e. image maps comprising all points of strong or weak feature maps 362, 364 having the same feature type) may be processed using hysteresis thresholding or any other method known in the art to fill in any lapses in the sub-maps. Each sub-map may, for example, show edges having a corresponding orientation.

Processed strong and/or weak feature maps 362, 364 and/or sub-maps for each quantized feature (i.e. feature maps corresponding to all points with same feature type) are output in block 390. The feature map(s) may be used to identify pose of an object 12 using one or more of the methods described elsewhere herein. In some embodiments, processed strong and/or weak feature maps 362, 364 and/or the sub-maps for each quantized feature are combined (e.g. merged or added together). The combined feature maps may, for example, be used to identify pose of an object 12 using one or more of the methods described elsewhere herein. For example, a 2D pattern-matching algorithm as described elsewhere herein may be applied to match features corresponding to values in the feature maps against a database of synthetic templates for objects 12.

In some embodiments, method 300 is used to recognize edges located within images of aligned set 304. In such embodiments, pixel values corresponding to pixels located within a region 312 are processed, for example, to classify a pixel location within aligned set 304 corresponding to a region 312 on the basis of whether or not the pixel location represents an edge. For example, the pixel location defining the region 312 may be classified as a "strong" edge, a "weak" edge or a non-edge (as described elsewhere herein in relation to classification of features generally). The pixel location may, for example, be considered to represent an edge if pixel values in the region 312 which surround the pixel location are arranged in an manner consistent with presence of an edge. In some embodiments, pixel values corresponding to pixel located within the region 312 are used to ascertain an orientation of an edge represented by the pixel location. As described above, orientations may be quantized. For example, each edge feature may be classified as corresponding to one of a plurality of predetermined gradients. For example, there may be the range of 3 to 20 predetermined gradients in some embodiments. One example implementation classifies detected edge features into one of eight types each corresponding to a range of gradients.

In such embodiments, strong feature map 362 may indicate pixel locations in aligned set 304 classified as representing "strong" edges (i.e. pixel locations that strongly (according to a value of a suitable metric) represent an edge). Weak feature map 364 corresponds to pixel locations in aligned set 304 classified as representing "weak" edges (i.e. pixel locations that may or may not (according to one or more threshold values) represent an edge). As described elsewhere herein, each of strong and weak feature maps 362, 364 may, for example, be processed to fill in one or more lapses (i.e. edge gaps) in strong feature map 362. Processed strong and/or weak feature maps 362, 364 may be used to ascertain an orientation of an object 12 as described elsewhere herein.

Method 300 may be performed for one, two, or more sets of depth plane images. In some embodiments, feature maps for plural depth planes are processed to determine the pose of an object.

In some embodiments, system 10 comprises one or more processors configured to perform method 300. In some embodiments, system 10 comprises one or more commercially available graphics processing units (GPUs) which may be used to partially or fully perform method 300.

A 2D pattern-matching algorithm can be applied to the detected features. The pattern matching algorithm may, for example match points on the detected contours against a database of synthetic templates for objects 12. Matching of the points to different ones of the templates may be scored and the best match selected based on the scores. The templates may be generated from the known forms of objects 12. The pattern-matching algorithm may use discriminant contour points (based on the magnitude of the edge) to match against the database of synthetic object templates. A wide variety of template-based pattern-matching algorithms are known in the art and a range of software products that implement pattern-matching are commercially available.

In some embodiments, the synthetic templates comprise photo-realistic templates (e.g. templates comparable to one or more photographs of the information represented within the template). Such templates may, for example, be rendered from one or more synthetic images (e.g. computer-generated images). For example, one or more synthetic images of an object 12 and/or bin 14 may be used to render one or more photo-realistic templates representative of one or more poses of one or more objects 12 within bin 14.

In some embodiments, once "coherent" contours have been identified for a particular depth plane, the contours are "warped back" to an image plane of one of the cameras (e.g. a camera 18 located at or near a center of the array of cameras). This may be done by inverting the initial homography transformation. The 2D template-matching can then be performed on the resulting image. This facilitates template-matching wherein the templates are based on images of objects 12 from the point-of-view of a camera 18 above the object.

In some cases a first depth plane may contain too few features to determine the pose of an object. A second depth plane may be associated with more features. The features associated with the first depth plane may optionally be used to refine the estimation of the pose of an object 12 based on the features associated with the second depth plane and/or features obtained by processing two or more depth planes may be used to determine a pose of the object.

Processing of depth planes may proceed until one depth plane includes sufficient contours that the 2D pattern matching algorithm can determine a pose of at least one object 12 with a desired level of certainty.

The output of the pattern-matching is the 6D pose of one or more objects 12 in bin 14. This output may be provided to a control system for a robot. The control system may then operate the robot to pick one of the objects 12 from bin 14 and place, assemble, process or otherwise interact with the object 12.

In some embodiments, two or more different depth planes are combined (e.g. by adding the data corresponding to each depth plane) to generate an aggregate depth plane. The aggregate depth plane may be used to detect and/or match one or more features contained within the aggregate depth plane according to any method described elsewhere herein.

In some embodiments, features are directly extracted from camera views (i.e. images generated by cameras 18). The extracted features may be warped into a plurality of depth plane images corresponding to a depth plane as described elsewhere herein. Pose of an object 12 may be determined from the warped extracted features as described elsewhere herein.

In some embodiments, one or more stages in processing as described herein are implemented using hardware acceleration. For example, one or more or all of the feature detection methods, the homography and/or warping methods, the depth plane transformation methods and/or the pattern-matching methods described herein may be partially or fully accelerated using one or more hardware components.

As described elsewhere herein, examples of specifically designed hardware components are: logic circuits, application-specific integrated circuits ("ASICs"), large scale integrated circuits ("LSIs"), very large scale integrated circuits ("VLSIs"), and the like. Examples of configurable hardware components are: one or more programmable logic devices such as programmable array logic ("PALs"), programmable logic arrays ("PLAs"), and field programmable gate arrays ("FPGAs")).

The hardware acceleration may, for example, be modular. A module may be designed to implement a discrete task. The discrete task may comprise a full process such as edge detection or a portion of a process such as determining a gradient to be used in edge detection. Two or more modules may be electrically coupled to partially or fully implement the technology described herein. In some embodiments, a module comprises one or more specifically designed and/or configurable hardware components. In some embodiments, two or more modules are contained within a single specifically designed and/or configurable hardware component.

The technology described herein has various applications outside of bin picking. For example, an approach as described herein may be applied to de-clutter X-ray images such as X-ray images of shipping cargo containers, trucks or the like, de-clutter images for other machine vision applications, identify object features lying in specific depth planes, etc.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in any of the methods described herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, and other devices suitable for the purposes described herein.

Aspects of the invention may also be provided in the form of program products. The program products may comprise any non-transitory medium which carries a set of computer-readable instructions which, when executed by a data processor, cause the data processor to execute a method of the invention (for example a method for determining the pose of an object 12 based on image data from plural cameras). Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. Apparatus for determining object pose, the apparatus comprising:
 a plurality of cameras arranged to obtain a corresponding plurality of camera images of a field of view, the field of view comprising a plurality of different views of one or more objects contained within a target volume; and
 a data processor connected to receive and process the camera images to generate a plurality of depth plane images and to process the plurality of depth plane images to locate one or more object features wherein the plurality of depth plane images includes a set of depth plane images corresponding to each of a plurality of depth planes and the object features include object features in each of two or more of the depth planes and to determine a pose of one or more of the objects contained within the target volume based on the located object features.

2. The apparatus according to claim 1 wherein the processor is configured to:
process the plurality of camera images to generate a first set of depth plane images corresponding to a first depth plane;
process the first set of depth plane images to locate one or more object features in the first set of depth plane images; and
transform the first set of depth plane images to yield one or more sets of transformed depth plane images, each set of transformed depth plane images corresponding to a depth plane different from the first depth plane.

3. The apparatus according to claim 1 wherein the processor is configured to process the plurality of camera images to generate a plurality of sets of depth plane images, each set of depth plane images corresponding to a different corresponding depth plane and comprising a plurality of depth plane images, and to process each of the sets of depth plane images to locate object features of the one or more object features in the set of depth plane images.

4. The apparatus according to claim 3 wherein the processor is configured to locate the object features in each of the two or more of the depth planes comprises the processor configured to apply an edge coherency method to select features located consistently in the sets of depth plane images corresponding to the two or more of the depth planes.

5. The apparatus according to claim 4 wherein the processor is configured to apply the edge coherency method comprises the processor configured to:
compute an edge direction of a first contour at a first contour point within a first depth plane image of one of the sets of depth plane images;
establish a search radius relative to the first contour point; and
determine whether a second depth plane image of the one of the sets of depth plane images includes a second contour that matches the first contour within the search radius.

6. The apparatus according to claim 3 wherein the processor is configured to remove clutter from one or more of the plurality of depth plane images by deleting from the one or more of the plurality of depth plane images one or more features that are not located consistently in the corresponding set of depth plane images.

7. The apparatus according to claim 4 wherein the processor is configured to process the plurality of depth plane images to locate one or more object features comprises the processor configured to:
construct a histogram for each of a plurality of regions within one of the plurality of depth plane images, the histogram comprising counts of a number of features in the region of each of a plurality of feature types;
calculate a mode value for each of the histograms; and
classify the regions based on the mode values.

8. The apparatus according to claim 7 wherein the processor is configured to re-classify one or more of the regions based at least in part on classifications of neighbouring ones of the regions.

9. The apparatus according to claim 1 wherein the processor is configured to process the plurality of camera images to generate a plurality of depth plane images comprises the processor configured to apply homography mappings from image planes of the camera images to one or more depth planes of the depth plane images.

10. The apparatus according to claim 1 comprising a plurality of light sources controllable by the processor, the light sources controllable to emit light that can be detected by the cameras upon being reflected from one or more of the objects wherein the processor is configured to control the light sources illuminate the target volume from different directions while obtaining the camera images.

11. The apparatus according to claim 10 wherein the processor is configured to control the light sources such that different ones of the light sources emit light at different times.

12. The apparatus according to claim 1 wherein the processor is configured to determine pose of one or more of the objects contained within the target volume using the located features comprises the processor configured to apply a two-dimensional pattern-matching algorithm, the pattern-matching algorithm comparing the located features to features contained within one or more templates.

13. The apparatus according to claim 12 wherein the processor is configured to apply the two-dimensional pattern-matching algorithm comprises the processor configured to compare contours corresponding to the detected features to contours of synthetic templates of the objects.

14. The apparatus according to claim 1 wherein the processor is configured to determine the pose of one or more of the objects contained within the target volume using the located features comprises the processor configured to transform contours from a depth plane to an image plane.

15. The apparatus according to claim 1 wherein adjacent ones of the depth planes are separated by distances in the range of about 0.3 mm to about 1 cm.

16. The apparatus according to claim 15 wherein the processor is configured to adaptively adjust the distances between the adjacent depth planes.

17. The apparatus according to claim 1 wherein the processor is configured to process the plurality of camera images to generate the depth plane images comprises the processor configured to apply a projective mapping to each of the plurality of camera images, the mapping projecting features in the camera image into the depth plane corresponding to the depth plane image.

18. The apparatus according claim 1 wherein each of the plurality of cameras is mounted to a supporting frame at known positions relative to one another and relative to the target volume.

19. Apparatus for determining object pose, the apparatus comprising:
a plurality of cameras arranged to obtain a corresponding plurality of camera images of a field of view, the field of view comprising a plurality of different views of one or more objects contained within a target volume; and
a data processor connected to receive and process the camera images to generate a plurality of depth plane images and to process the plurality of depth plane images to locate one or more object features wherein the plurality of depth plane images includes a set of depth plane images corresponding to each of a plurality of depth planes and the object features include object features in each of two or more of the depth planes and to determine a pose of one or more of the objects contained within the target volume based on the located object features
wherein the processor is configured to omit from processing one or more of the sets of depth plane images that correspond to depth planes above an elevation at which a topmost object was previously found.

20. Apparatus for determining object pose, the apparatus comprising:
- a plurality of cameras arranged to obtain a corresponding plurality of camera images of a field of view, the field of view comprising a plurality of different views of one or more objects contained within a target volume;
- a range finder operable to determine an elevation of a topmost object contained within the target volume;
- a data processor connected to receive and process the camera images to generate a plurality of depth plane images and to process the plurality of depth plane images to locate one or more object features wherein the plurality of depth plane images includes a set of depth plane images corresponding to each of a plurality of depth planes and the object features include object features in each of two or more of the depth planes and to determine a pose of one or more of the objects contained within the target volume based on the located object features and the data processor is configured to omit from processing one or more of the sets of depth plane images that correspond to depth planes above the elevation.

* * * * *